United States Patent [19]

Noda

[11] 4,281,808
[45] Aug. 4, 1981

[54] FISHING REEL

[75] Inventor: Hideo Noda, Sakai, Japan

[73] Assignee: Shimano Industrial Company, Limited, Osaka, Japan

[21] Appl. No.: 104,434

[22] Filed: Dec. 17, 1979

[30] Foreign Application Priority Data

Dec. 30, 1978 [JP] Japan ............................ 53-183727[U]

[51] Int. Cl.³ ............................................ A01K 89/02
[52] U.S. Cl. ................................. 242/218; 192/67 R; 242/220
[58] Field of Search ............... 242/211, 212, 213, 214, 242/216, 217, 218, 219, 220, 221; 192/67 R, 93 R, 93 C

[56] References Cited

U.S. PATENT DOCUMENTS

| 2,130,581 | 9/1938 | Case | 242/220 |
| 2,446,354 | 8/1948 | Wolfe | 242/212 |
| 4,014,422 | 3/1977 | Morishita | 192/67 R |

*Primary Examiner*—Billy S. Taylor

*Attorney, Agent, or Firm*—Stevens, Davis, Miller & Mosher

[57] ABSTRACT

A fishing reel, in which a clutch lever supported to a stationary member is provided at the foremost end with an arm supported swingably through a pivot pin extending substantially parallel to the axis of a spool shaft, the arm having engaging means engageable with one of projections at a return plate and two first and second stopper means for restricting a swinging range of the arm; and a spring member is arranged between the arm and the stationary member at an intermediate position between two positions of the pin swingable together with the clutch lever, the two positions corresponding to first and second positions of the clutch lever; so that when the clutch lever is moved forward from the first position to the second position thereof, the spring member is switched in its working direction at an intermediate position between the first and second positions so as to allow said arm to swing, thereby allowing the engaging means at the arm to enter into a circular locus of rotation of the projections.

4 Claims, 5 Drawing Figures

FISHING REEL

BACKGROUND OF THE INVENTION

This invention relates to a fishing reel of a double-bearing type, which winds up a fishing line onto a spool rotated by operating a handle, and more particularly to the improvements wherein a fishing reel including a stationary member fixed to a fishing rod, a spool shaft supported rotatably to the stationary member, a spool rotating together with the spool shaft, a pinion mounted on the spool shaft and slidably moving between its engaging position with the spool shaft and its disengaging position therefrom, a pinion holder supporting the pinion and biasing it toward the engaging position, a driving gear always in mesh with the pinion, an input shaft supporting the driving gear, a return plate having a plurality of projections and rotatable together with the driving gear integrally with the input shaft, and a clutch lever supported to the spool shaft slidably movably between first and second positions and in the direction perpendicular with respect to the axis of the spool shaft.

Conventionally, this kind of reel is so constructed that the clutch lever is operated to move forward to allow the pinion to slidably move and disengage from the spool shaft, thereby rotating the spool freely. While, the handle is turned to rotate the return plate so that the projections thereat contact with the utmost end of the clutch lever to move the clutch lever backward, whereby the pinion engages with the spool shaft, and rotation of the handle is transmitted to the spool through the driving gear and pinion.

In the aforesaid construction, the projections at the return plate happen to stay within a path of the clutch lever movement due to a position where the handle stops. In this instance, even when the clutch lever is operated in forward movement in order to disengage the pinion from the spool shaft, the projections staying within the path hinder the clutch lever from forward movement, which means that the so-called clutch disconnection is poor. The poor clutch disconnection is remarkable when a number of projections are provided at the return plate so that the clutch lever may be moved backward even with a slight turn of the handle.

In the case that the projections hinder forward movement of the clutch lever, the handle is slightly turned to shift the projections and then the clutch lever is reoperated, thus overcoming the aforesaid problem. However, the handle should be turned during operation of the clutch lever, resulting in very difficult control thereof. Occasionally, the clutch lever is forced to move forward, thereby causing a breakdown at the clutch lever or return plate.

In order to overcome the aforesaid problems, this invention has been designed. An object of the invention is to provide a fishing reel capable of; ensuring forward movement of the clutch lever regardless of a position where the handle stops; moving the clutch lever backward very quickly even with a little turn of the handle; and preventing a reel part, such as the clutch lever or return plate, from being broken during forward movement of the clutch lever.

In detail, the fishing reel of the invention is so constructed that; an arm is supported to the fore end of the clutch lever swingably through a pivot pin extending substantially axially of the spool shaft, the arm having engaging means engageable with one of the projections at the return plate and two first and second stopper means for restricting the arm in its swinging range; and a spring member is disposed between the arm and a stationary member positioned at an intermediate portion between two positions of the pin movable together with the clutch lever, the two positions corresponding to first and second positions of the clutch lever, so that when the clutch lever moves forward from the first position to the second, the spring member is changed-over in its working direction at the intermediate position between the two positions of the pin and allows the arm to swing, whereby the engaging means at the arm enters in a circular locus of rotation of the projections.

When the clutch lever moves forward, whatever position the projections thereof stay at, the engaging means at the arm interfere with no projection due to the fact that, when the clutch lever is positioned between the first position and the intermediate position, the arm is biased by the spring member in the direction of keeping the engaging means away from the projections, and is kept in its position by a first stopper means.

When the clutch lever moves beyond the intermediate position to reach the second position (the forward movement terminal), the pivot pin moves beyond the end of spring member supported to the stationary member, and the spring member changes in its biasing direction to swing the arm, thereby allowing the engaging means to enter into the circular locus of rotation of the projections at the return plate. Since the arm can swing in the same direction as rotation of the return plate by operating the handle, even if one of the projections is positioned ahead of the swinging arm and interferes therewith, the arm merely comes to a halt halfway during the swinging motion, thereby allowing the clutch lever to move forward with ease. While, when the return plate rotates through the handle, the projection in interference with the engaging means rotates to escape therefrom to thereby allow the arm to swing until a second stopper means contacts with the clutch lever. As a result, the engaging means engages with the next projection rearward in the rotation direction, whereby the backward movement of clutch lever is performable.

As seen from the above, the clutch lever always ensures its forward movement regardless of any position of the projection at the return plate, and also its backward movement by operating the handle after a finish of the forward movement.

The above and other related objects and features of the invention will be apparent from a reading of the following description of the disclosure found in the accompanying drawings and the novelty thereof pointed out in the appended claims.

DETAILED DESCRIPTION OF THE INVENTION

Figure 1:
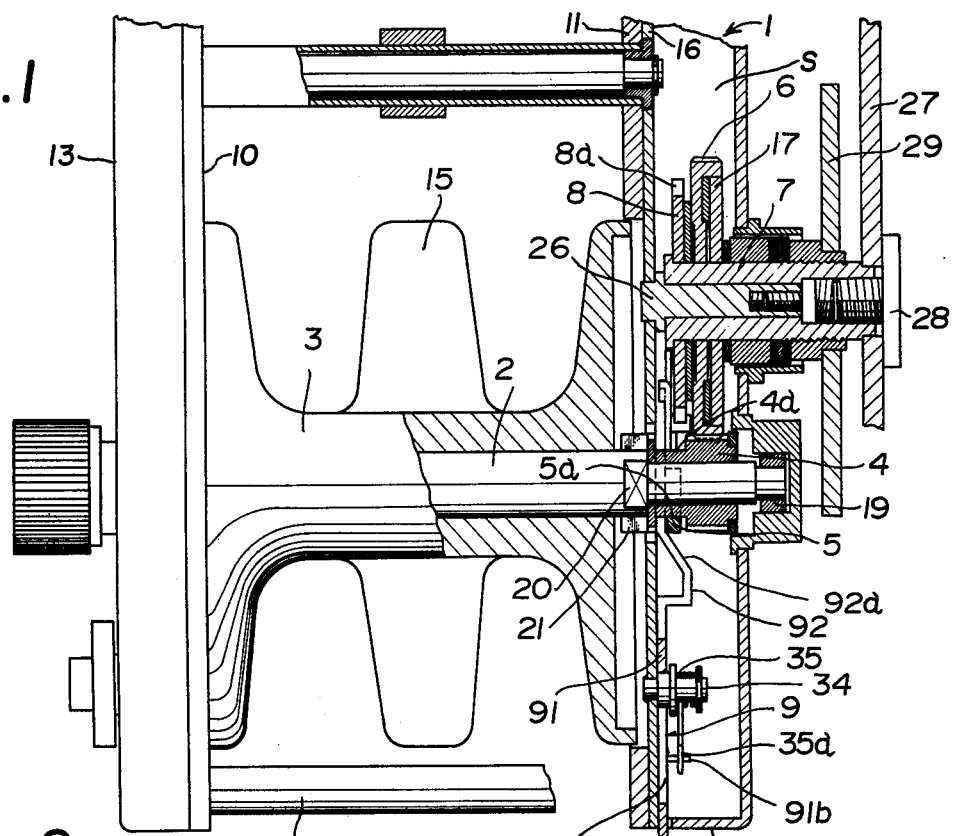
FIG. 1 is a partially cutaway plan view of a typical embodiment of the fishing reel of the invention.

A fishing reel of the invention, similarly to a conventional one, basically comprises a stationary member 1, a spool shaft 2 rotatably supported thereto, a spool 3 supported to the spool shaft 2 and rotatable together therewith, a pinion 4 sleeved onto the spool shaft 2 and slidably movable axially thereof between the positions where the pinion 4 engages with and disengages from an emgaging portion to be hereinafter described, at the spool shaft 2, a pinion holder 5 holding the pinion 4, a driving gear 6 always in mesh with the pinion 4, an input shaft 7 carrying the driving gear 6, a return plate 8 having a plurality of projections 8a and being supported to the input shaft 7 rotatably together with the driving gear 6, and a clutch lever 9 supported to the stationary member 1 slidably movably in the direction perpendicular to the axis of spool shaft 2 and between a first position shown in FIG. 2 and a second position shown in FIG. 3.

The stationary member 1 comprises a pair of left and right side-plates 10 and 11 opposite to each other and spaced at a regular interval, a plurality of connecting rods 12 for connecting the plates 10 and 11, and outer covers 13 and 14 covering the plates 10 and 11 respectively, the plates 10 and 11 having at the lower portions thereof, i.e., at a side of mounting the reel to a fishing rod (not shown), a mounting member 15 through which the reel is mounted to the fixing rod.

Referring to FIG. 1, a vacancy S is formed between the righthand cover 14 and a fixed plate 16 in close contact with the right side-plate 11 at the outside thereof, the vacancy S housing therein the driving gear 6, return plate 8, pinion 4, pinion holder 5, clutch lever 9, and a friction plate 17 and a back stop pawl 18, to be hereinafter described.

The spool shaft 2 is journaled in bearings 19 provided at both the covers 13 and 14, and comprises a larger diameter portion and a smaller diameter portion at the righthand end. The smaller diameter portion projects outwardly from the side-plate 11 and is journaled in the bearing 19. The pinion 4 is supported axially movably onto the smaller diameter portion. The larger diameter portion is provided at its one axial end adjacent to the smaller diameter portion with two opposite flat faces as the engaging portions 20 and the pinion 4 is provided at its axially left end with cutouts 21 engageable with the engaging portions 20. The spool shaft 2 rotates integrally with the pinion 4 through the engagement of cutouts 21 with the engaging portions 20. While, the pinion 4 moves rightward to release the engagement, whereby the spool shaft 2 has no conncection with the pinion 4 to permit free rotation of the spool 3 fixed to the spool shaft 2.

The pinion 4 axially moves through the pinion holder 5 operated by the clutch lever 9 in such a manner that an annular groove 4a is formed onto the pinion 4 at a substantially intermediate portion axially thereof, and a semicircular cutout 5a is formed at the pinion holder 5 at an intermediate portion longitudinally thereof, so that the cutout 5a engages with the annular groove 4a to thereby allow the pinion 4 to axially move following the pinion holder 5.

At the fixed plate 16 are fixed a pair of headed holts 22 and 23 spaced at a regular interval, to which bolts the pinion holder 5 is supported in relation of being movable axially of the spool shaft 2. Between the heads of bolts 22 and 23 and the pinion holder 5 are inserted springs 24 and 25 respectively, the springs 24 and 25 biasing the pinion holder 5 toward the right side-plate 11 and fixed plate 16. Hence, when the clutch lever 9 exists in a first position as shown in FIG. 2, the pinion 4, as shown in FIG. 1, is biased by the springs 24 and 25 toward the engagements 20 through the pinion holder 5, whereby the cutouts 21 at the pinion 4 engage with the engagements 20 at the spool shaft 2 respectively. While, when the clutch lever 9 moves forward to reach the second position as shown in FIG. 3, the clutch lever 9 shifts the pinion holder 5 rightward in FIG. 1 against the springs 24 and 25, so that the cutouts 21 disengage from the engaging portion 20.

The input shaft 7, which carries the driving gear 6 and return plate 8, comprises a tubular shaft and is sleeved rotatably onto a support shaft 26 fixed at its one end to the fixed plate 16. The input shaft 7 projects at its righthand end outwardly from the righthand cover 14, the projecting end being screwed with a handle 27 through screw means 28.

The friction plate 17 and return plate 8 are fixed to the input shaft 7, and are rotatable together therewith. The driving gear 6 is supported rotatably with respect to the input shaft 7, so that the friction plate 17 press-contacts with the driving gear 6 to thereby transmit the driving force from the input shaft 7 to the driving gear 6.

A control plate 29 screwable with the input shaft 7 is operated to adjust the friction plate 17 in its press-contact strength applied to the driving gear 6. Hence, the driving force applied to the spool 3 is changeable through the handle 27, whereby the friction plate 17, when a load more than the driving force is applied to the spool 3, slips to allow the input shaft 7 to be idle. This mechanism is general and is not so important for the invention, whereby its detailed description is omitted herewith.

The back stop pawl 18 engages at its tip with one of the projections 8a at the return plate 8 to thereby prevent reverse rotation of the input shaft 7. The pawl 18 is mounted to the fixed plate 16 and is operated by control means 31 having a lever 30, thereby allowing the pawl 18 to engage with or disengage from the projection 8a.

The control means 31 is supported to the fixed plate 16 and the lever 30 projects at its tip radially outwardly of the righthand cover 14. Between the control means 31 and the right side-plate 14 is inserted a change-over spring 32. A return spring 33 for the back stop pawl 18 is provided thereat.

In addition, the fixing plate 16, which is fixed to the right side-plate 11, is not necessary for use.

The two support bolts 22 and 23 for the pinion holder 5 may be replaced by one spindle perpendicular to the axis of the spool shaft 2, the spindle swingably supporting the pinion holder 5.

Alternatively, the projections 8a may be provided at one side of the return plate 8, and the back stop pawl 18 may be replaced by an anti-reverse-rotation gear independently of the return plate. The return spring 33 for the back stop pawl 18 may be replaced by friction plates contacting with both sides of the return plate 8 or anti-reverse-rotation gear.

In the fishing reel of a double bearing type constructed as foregoing, this invention has been designed to constitute the following mechanism for controlling the pinion 4 by use of the clutch lever 9, in other words, for controlling to transmit or cut off the driving force to be transmitted to the spool shaft 2.

Figure 2:
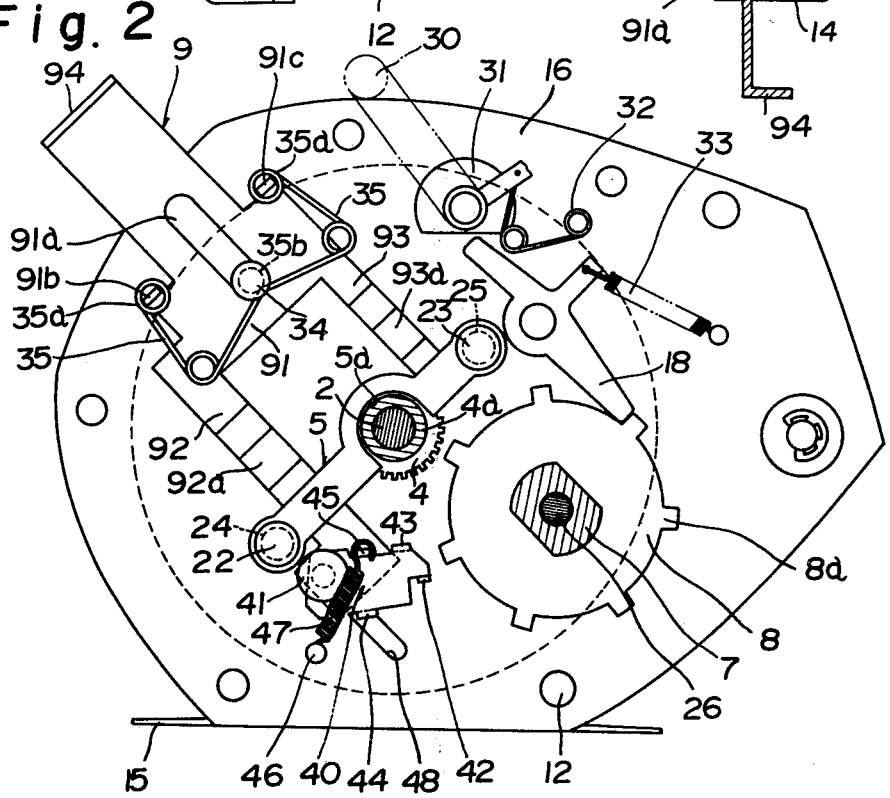
FIG. 2 is a partially cutaway side view thereof, in which an outer cover is removed.
Figure 3:
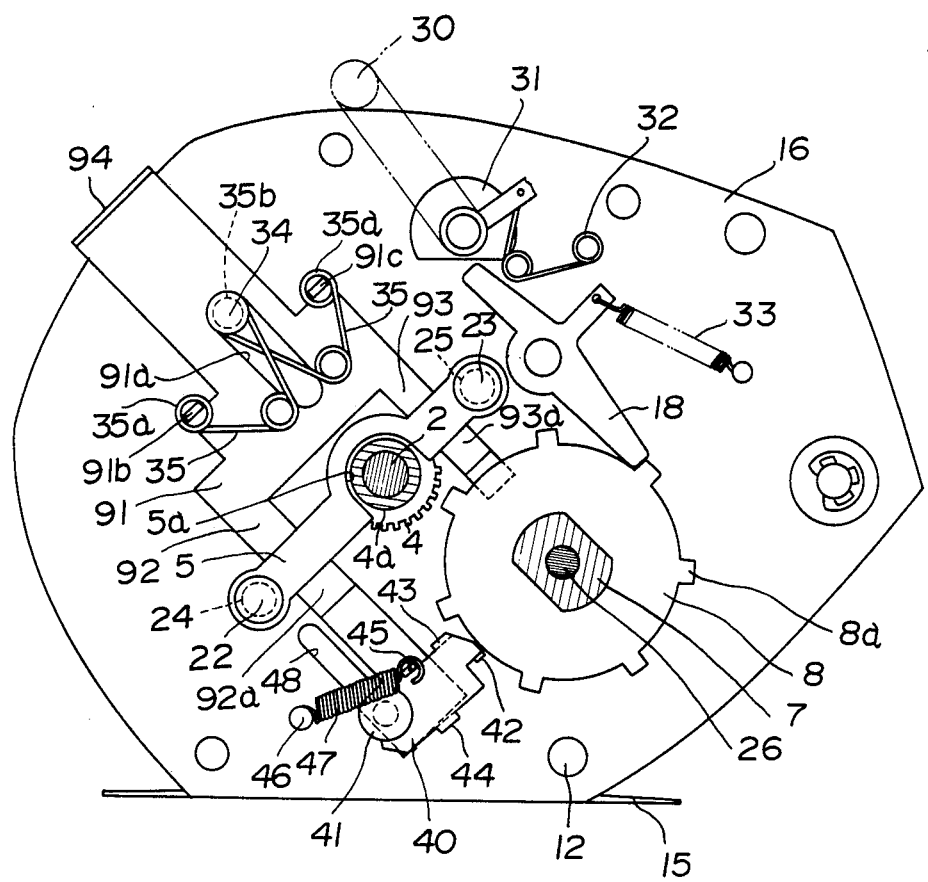
FIG. 3 is a partially cutaway side view of the fishing reel, in which a clutch lever is moved to a second position from the position shown in FIG. 2.

Firstly, the clutch lever 9, as shown in FIGS. 2 and 3, is supported to the right side-plate 11 in relation of being movable in reciprocation between the aforesaid first and second positions along the outer surface of the fixed plate 16, and comprises a base 91, a fork of two legs 92 and 93 extending from the base 91 toward the pinion 4, and a control 94 extending from the base 91 radially outwardly of the cover 14. The legs 92 and 93 are provided with slant faces 92a and 93a, the base 91 is provided with an elongate slot 91a extending in the direction of reciprocation of the clutch lever 9, a pin 34 fixed to the fixed plate 16 is inserted into the slot 91a, two spring seats 91b and 91c are provided at the base 91, and between the pin 34 and the spring seats 91b and 91c are separately mounted two springs 35 of substantially V-like shaped and each having first and second ends 35a and 35b.

The spring seats 91b and 91c, when the clutch lever 9 is in the first position as shown in FIG. 2, are positioned rearwardly of the pin 34 in the direction of forward movement of the clutch lever 9. In other words, the first end 35a of each spring 35 is positioned rearwardly of the pin, i.e., second end 35b, in the aforesaid direction, so that the springs 35 may bias the clutch lever 9 toward the terminus of backward movement thereof to thereby keep the clutch lever 9 in the first position. On the other hand, when the clutch lever 9 moves forward from the first position to reach the second position as shown in FIG. 3, the first ends 35a of springs 35 are positioned ahead of the pin 34, i.e., the second ends 35b, in the direction of forward movement of the clutch lever 9, thereby biasing the clutch lever 9 toward the terminus of forward movement thereof to keep the lever 9 in the second position.

Alternatively, a coil spring as conventional may, instead of the springs 35, be used to bias the clutch lever 9 toward the first position only and a retaining mechanism for the clutch lever 9 may be provided between the clutch lever 9 and the right side-plate 11 or fixed plate 16.

One leg 92 of the fork at the clutch lever 9 is made longer in length than the other leg 93, the longer leg 92 being provided with an arm 40 as described as follows:

The arm 40 is supported to the utmost end of leg 92 swingably around a pivot pin 41 extending substantially axially of the spool shaft 2, and has engaging means 42 engageable with one of the projections 8a at the return plate 8 and first and second stopper means 43 and 44 for restricting swinging motion of the arm 40.

The engaging means 42 and the first and second stopper means 43 and 44, are formed by bending the edge of the arm 40, or comprise pins or strips separate from the arm 40. The engaging means 42 is extended toward the return plate 8 to be engageable with one of the projections 8a thereof, and the first and second stopper means 43 and 44 are extended toward the fork leg 92 and engages with the side edge face and fore end face of the leg 92 respectively. A spring member 47 mainly comprising a coiled spring is retained at one end thereof to a pin 46 fixed to the fixed plate 16 and at the other end to a spring seat 45 mounted to an intermediate portion lengthwise of the arm 40.

The fixed pin 46 is positioned correspondingly to the middle point of a moving range of the pivot pin 41 following the clutch lever 9 movement forward from the first to the second position. Hence, during forward movement of the clutch lever 9 from the first position to the intermediate position, the spring member 47, as shown in FIG. 2, biases the arm 40 clockwise and allows the first stopper means 43 to elastically abut against the side edge face of the fork leg 92. At this time, the engaging means 42 is positioned out of a circular locus of rotation of the projections 8a. Next, when the clutch lever 9 further moves forward beyond the intermediate position, the pivot pin 41 moves beyond the line of action of the spring member 47 connecting the fixed pin 46 and spring seat 45, whereby the working direction of spring member 47 is changed-over to swing the arm 40 counterclockwise, resulting in that the second stopper means 44 abut against the fore end face of the leg 92 as shown in FIG. 3. Also, the arm 40 swings to allow the engaging means 42 to enter into the circular locus of rotation of the projections 8a.

Figure 4:
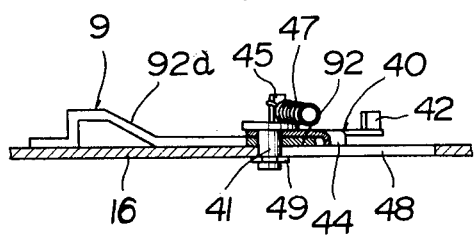
FIG. 4 is a longitudinal sectional view of the principal portion only.
Figure 5:
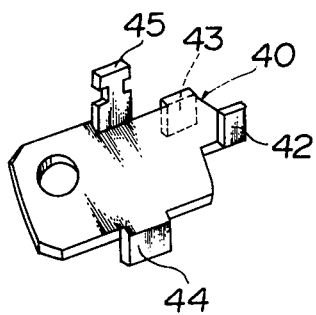
FIG. 5 is a perspective view of an arm only.

Alternatively, the pivot pin 41, as shown in FIG. 4, may be elongated, perforate through a slot 48 provided at the fixed plate 16, and be mounted to the inner surface thereof by means of mounting means 49, such as a snap ring. By this, the movement of pivot pin 41 through the slot 48 cooperates with that of the pin 34 through the slot 91a to thereby guide the clutch lever 9 slidably without a twist.

In the fishing reel of the invention constructed as foregoing, when the clutch lever 9 is at the first position as shown in FIGS. 1 and 2, the cutouts 21 of the pinion 4 engage with the engagements 20 at the spool shaft 2, so that rotation of the handle 27 is transmitted from the input shaft 7 to the spool shaft 2 through the friction plate 17, driving gear 6 and pinion 4, thereby rotating the spool 3 for winding thereon a fishing line as desired. In the case that the fishing line is drawn out of the spool 3 for casting, the control 94 is pushed to move the clutch lever 9 forward against the springs 35 toward the second position in FIG. 3, the slant faces 92a and 93a at the clutch lever 9 abut against the pinion holder 5; the pinion holder 5 moves, following the forward movement of clutch lever 9, axially rightward (in FIG. 1) of the spool shaft 2 against the springs 24 and 25; and the pinion 4 moves axially rightward to disengage from the spool shaft 2; thereby enabling the spool shaft 2 to freely rotate. In this operation of the clutch lever 9, the springs 35 are switched in the biasing direction through the forward movement of clutch lever 9 to thereby bias the lever 9 toward the terminus of forward movement thereof to prevent careless backward movement.

It is to be noted that, until the clutch lever 9 moves forward beyond the intermediate position, there is no fear that the engaging means 42 at the arm 40 abuts against the projection 8a to hinder the clutch lever 9 from its forward movement, because the engaging means 42 is kept away from the circular locus of rotation of projections 8a at the return plate 8. While, when the pivot pin 41 at the arm 40 passes through the line of action of the spring member 47, the spring member 47 is switched to bias the engaging means 42 to enter into the circular locus of the projections 8a and allow the second stopper means 44 to engage with the fore end face of the fork leg 92.

Under these conditions, when the handle 27 is turned in order to again wind up the line onto the spool 3, the projection 8a hits the engaging means 42, and the second stopper means 44 pushes the clutch lever 9, whereby the clutch lever 9 moves backward against the springs 35. During the backward movement, when the clutch lever 9 moves beyond the intermediate position, the springs 35 are reswitched to bias the clutch lever 9 toward the terminus of backward movement thereof, whereby the clutch lever 9 is kept at the first position so it will not carelessly move forward. In other words, the return plate 8 is enough to move the clutch lever 9 backward only until the switching point of biasing direction of the respective springs 35. Thereafter, the springs 35 will perform the further backward movement of clutch lever 9.

During the above operation, the spring member 47 switched in its working direction allows the arm 40 to swing and the engaging means 42 at the arm 40 tends to enter into the circular locus of rotating projections 8a. At this time, even when one projection stays as an obstacle ahead of the engaging means 42 in the direction of swinging of the arm 40, the arm 40 merely comes to a halt halfway of its swinging motion due to the engaging means 42 in interference with the one projection 8a, resulting in no hindrance to forward movement of clutch lever 9. The arm 40, as shown in FIGS. 2 and 3, is attached to the fork leg 92 at a side of the mounting member 15 attached to the side plate 11 and swings in the same direction as rotation of the return plate 8 operated by the handle. Hence, when the return plate 8 rotates, the one projection 8a in interference with the engaging means 42 escapes therefrom, whereby the arm 40 can swing until the second stopper means 44 engages with the fore end face of the fork leg 92, and then engages with a following projection 8a rearward in the direction of rotation of the return plate 8, thereby performing the backward movement of clutch lever 9.

In the above case that the arm 40 is provided at the mounting member 15 side, it is necessary for the clutch lever 9 to slide linearly between the first and second positions and to be kept thereat by the springs 35. Hence, whereas the arm 40 is provided at the mounting member 15 side, the return plate 8 rotates to operate the projections to perform the backward movement of clutch lever 9. From such a construction, the back stop pawl 18, as shown in FIGS. 2 and 3, can be arranged at the reverse side to the arm 40 with respect to the return plate 8. Therefore, in the construction that the back stop pawl 18 is operated by the control means 31 as shown in FIGS. 2 and 3, the lever 30 at the control means 31 can be disposed at the reverse side to the mounting member 15, in other words, at the position most apart therefrom, thereby improving the controllability of the reel.

As clearly understood from the aforesaid description, the fishing reel of the invention is so constructed that the arm having the engaging means engageable with the projections at the return plate is supported to the clutch lever, the arm being swingable halfway of forward movement of the clutch lever 9 by means of the spring member. The engaging means is kept away from the circular locus of rotation of the projections before the swinging motion of the arm commences, and enters into the circular locus after the swinging motion. Hence, the clutch lever is movable forward without hindrance regardless of any position of the projection with respect to the clutch lever. As a result, there is no fear that the engaging means is checked by the projection rendering to impossible control of the clutch lever. Notwithstanding this, revolution of the handle ensures backward movement of the clutch lever.

Accordingly, the clutch lever can be moved forward and backward smoothly and reliably. Furthermore, there is no fear that the clutch lever is forced to move forward so as to break the pinion or return plate. Consequently, the return plate can have an increased number of projections at the return plate, so that the handle is turned a little to thereby return the clutch lever very quickly and accurately.

While a preferred embodiment of the invention has been described using specific terms, such description is for illustrative purpose only, and it is to be understood that changes and variations may be made without departing from the spirit or scope of the following claims.

What is claimed is:

1. In a fishing reel including a stationary member fixed to a fishing rod, a spool shaft supported rotatably to said stationary member, a spool rotating together with said spool shaft, a pinion being positioned on said spool shaft and slidably movable between a position where said pinion engages with said spool shaft and a position where said pinion disengages from said spool shaft, a pinion holder carrying said pinion and biasing said pinion toward said engaging position, a driving gear always in mesh with said pinion, an input shaft supporting said driving gear, a return plate having a plurality of projections and being rotatable together with said driving gear integrally with said input shaft, and a clutch lever supported to said stationary member slidably movably between a first position and a second position in the direction perpendicular to the axis of said spool shaft, the improvements wherein are provided; an arm disposed at the fore end of said clutch lever; a pivot pin extending substantially parallel to the axis of said spool shaft and supporting said arm swingably; engaging means provided at said arm and engageable with one of said projections at said return plate; and a first stopper means and a second stopper means for restricting said arm in its swinging range, both said stopper means being provided at said arm, extending toward said clutch lever, and engaging therewith; and a spring member being disposed between said arm and said stationary member at an intermediate position between two positions of said pin movable together with said clutch lever, the two positions corresponding to the first and second positions of said clutch lever, so that until said clutch lever moves forward from the first position beyond an intermediate position between the first and second positions, said spring member biases said arm in the direction of allowing said first stopper means to engage with said clutch lever to thereby keep said engaging means away from a circular locus of rotation of said projections at said return plate, and after said clutch lever moves beyond said intermediate position, said spring member is switched in its working direction to swing said arm and engage said second stopper means with said clutch lever, thereby allowing said engaging means to enter in said circular locus of rotation of said projections.

2. A fishing reel according to claim 1, wherein said clutch lever has restricting means for restricting the first and second positions of said clutch lever, and spring means for biasing said clutch lever toward said restricting means, said spring means being switched in its biasing direction through the forward and backward movements of said clutch lever, thereby biasing said clutch lever toward the terminus of backward movement and that of forward movement of said lever at the first and second positions respectively.

3. A fishing reel according to claim 2, wherein said restricting means comprises an elongate slot provided at said clutch lever and a pin fixed to said stationary member and inserted into said slot, said spring means comprise two springs which are made of spring steel, each substantially V-like shaped, and each have a first and a second end, said first end being supported to said clutch lever, said second end being supported to said pin, so that when said clutch lever is in the first position, said first end is positioned rearward with respect to said pin in the direction of forward movement of said clutch lever to thereby bias said clutch lever toward the terminus of backward movement thereof, and when said clutch lever moves forward to reach the second position, said first end is positioned forward with respect to said pin in the direction of forward movement of said clutch lever to thereby bias said clutch lever toward the terminus of forward movement thereof.

4. A fishing reel according to claim 2, wherein said stationary member has a mounting member for mounting the reel to said fishing rod, said arm provided at the fore end of said clutch lever is disposed at a side of said mounting member of said stationary member, and at the reverse side to said arm beyond said return plate are provided a back stop pawl engageable with one of said projections to stop the reverse rotation of said driving gear and a control means for operating said back stop pawl.

* * * * *